(12) United States Patent
Klappert et al.

(10) Patent No.: US 8,753,185 B1
(45) Date of Patent: Jun. 17, 2014

(54) SYSTEMS AND METHODS FOR IMPLEMENTING A DEGREE OF SEPARATION GAME IN AN INTERACTIVE MEDIA APPLICATION

(71) Applicant: United Video Properties, Inc., Santa Clara, CA (US)

(72) Inventors: Walter R. Klappert, Los Angeles, CA (US); Michael Case, Sherman Oaks, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/768,845

(22) Filed: Feb. 15, 2013

(51) Int. Cl.
*A63F 9/24* (2006.01)

(52) U.S. Cl.
USPC .................................. 463/9; 463/19; 463/42

(58) Field of Classification Search
USPC .................................. 463/9, 19, 42; 707/748
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0271272 A1* | 11/2007 | McGuire et al. | 707/9 |
| 2009/0158162 A1* | 6/2009 | Imai | 715/734 |
| 2010/0153885 A1 | 6/2010 | Yates | |
| 2011/0302174 A1* | 12/2011 | Greenshpan et al. | 707/748 |
| 2012/0030193 A1* | 2/2012 | Richberg et al. | 707/719 |
| 2012/0077580 A1* | 3/2012 | Mahajan et al. | 463/29 |
| 2012/0271883 A1* | 10/2012 | Montoya et al. | 709/204 |

OTHER PUBLICATIONS

Joint Venture 1, Famous Hookups, Feb. 10, 2012, http://www.famoushookups.com/site/six_degrees.php.*
Patrick Reynolds, Six Degree—Movie Trivia, Oct. 26, 2012, https://itunes.apple.com/us/app/six-degrees-movie-trivia/id328926385?mt=8.*
Christopher Riashi, Six Degrees of Separation| Hollywood Golf, Jan. 27, 2013, http://www.youtube.com/watch?v=4RaZblq3pxl.*
Zephyr Creative, Six Degrees of Separation, Jan. 27, 2010, http://www.148apps.com/app/351471052.*

(Continued)

*Primary Examiner* — Dmitry Suhol
*Assistant Examiner* — Jason Yen
(74) *Attorney, Agent, or Firm* — Ropes & Gray LLP

(57) ABSTRACT

Methods and systems of providing a game in an interactive media application based on information stored in a database are provided. The game is provided in part by using a database to select a source individual and a destination individual. Based on the source individual and information stored in a database and associated therewith, a plurality of associated candidates are selected, each of which has a defined relationship with the source individual. Representations of the source individual, the destination individual, and the first plurality of candidates are provided on a display. Based on user input, one candidate of the first plurality of candidates is selected, and it is determined whether the database defines a relationship between the selected candidate and the destination individual. If such a relationship exists, a user is alerted. If no such relationship exists, then a new set of candidates is retrieved based on the selected candidate.

30 Claims, 13 Drawing Sheets

(56) References Cited

OTHER PUBLICATIONS

Data, Inc. "Find the Bacon! Play the Game", 'NEW: Try out our new "Challenge" Mode. Set up a Challenge, time yourself, and challenge your friends to beat your time on Facebook!' http://findthebacon.com; retrieved Feb. 15, 2013 (2 pgs.).

* cited by examiner

SYSTEMS AND METHODS FOR IMPLEMENTING A DEGREE OF SEPARATION GAME IN AN INTERACTIVE MEDIA APPLICATION

BACKGROUND OF THE INVENTION

Parlor games that are centered upon connections between people, such as celebrities, are widely enjoyed. Some such games involve determining how many degrees of separation exist between two different celebrities. This is best explained by example: Samuel L. Jackson and Kevin Bacon are separated by one degree of separation, as they did not co-star in a movie together, but they did each co-star in a movie that included Kiefer Sutherland.

Currently, many limitations exist with regard to degree of separation games. Such games are often played mentally (e.g., Six Degrees of Kevin Bacon). Some limited electronic versions exist, such as http://findthebacon.com; however, such implementations require extensive knowledge of media information, such as knowledge of obscure movies actors have been in. Other limitations in degree of separation games include a lack of a finite number of choices of celebrities to choose from when progressing from a starting celebrity to an ending celebrity, a lack of an easy, intuitive implementation on media guidance equipment, and an inability to play against others electronically.

SUMMARY OF THE INVENTION

Methods and systems are provided herein for an interactive media application that provides a celebrity separation game (hereinafter referred to as "the Game"). The Game is presented by way of accessing a database to identify a source individual (e.g., a starting actor or actress) and a destination individual (e.g., an ending actor or actress), and providing representations of those individuals on a display. Candidates (e.g., actors or actresses who separate a starting and ending actor or actress) are then selected, and representations of those candidates are provided on the display. A user then selects one of the candidates (e.g., via a user input interface), and it is determined by accessing a database whether a defined relationship between the selected candidate and the destination individual exists (e.g., the actor or actress selected is only separated from the ending actor or actress by one degree of separation). Should a defined relationship exist, an alert may be presented on the display, and should a defined relationship not exist, processing circuitry will cause the selected candidate to replace the source individual, and a new set of candidates will be retrieved from the database based on who the selected candidate is.

When a candidate is selected, a media asset that is associated with a relationship between the selected candidate and the source individual is identified (e.g., by using processing circuitry). A user may be able to bookmark the identified media asset (e.g., store a reference or pointer to media content associated with an identified media asset for later use). Additionally, processing circuitry may cause a representation of a bookmarked media asset to be provided on the display. Furthermore, processing circuitry may cause a selectable opportunity associated with the bookmarked media asset to be generated, where the generated selectable opportunity may comprise a link to view the bookmarked media asset, an advertisement related to the bookmarked media asset, and/or a link to view media content associated with the bookmarked media asset.

In some embodiments, processing circuitry may cause a list of bookmarked media assets to be generated, such that a user may view the list of bookmarked media assets. Each entry in the list of bookmarked media assets may be selectable, such that further options related to a selected bookmarked media asset are presented to a user. For example, if the list of media assets includes a television episode, a user might use a user input interface to select a further option such as a different episode of the same television series, or a soundtrack relating to the selected television episode.

The game may be played by a plurality of users. In some cases, the plurality of users may play on a turn-by-turn basis. In other cases, the plurality of users may "race" to connect the source individual and the destination individual in the fewest number of turns, or using the fewest number of degrees of separation. Alternatively, in each of these cases, processing circuitry may cause alternating displays to be generated on one user equipment such that two users share one single user input interface and also share one single display. Furthermore, processing circuitry may cause a separate display to be portrayed on individual user equipment devices, such that each user has his or her own user input device, and such that each user plays by interacting with a media guidance application through his or her own display.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF EMBODIMENTS

Figure 1:
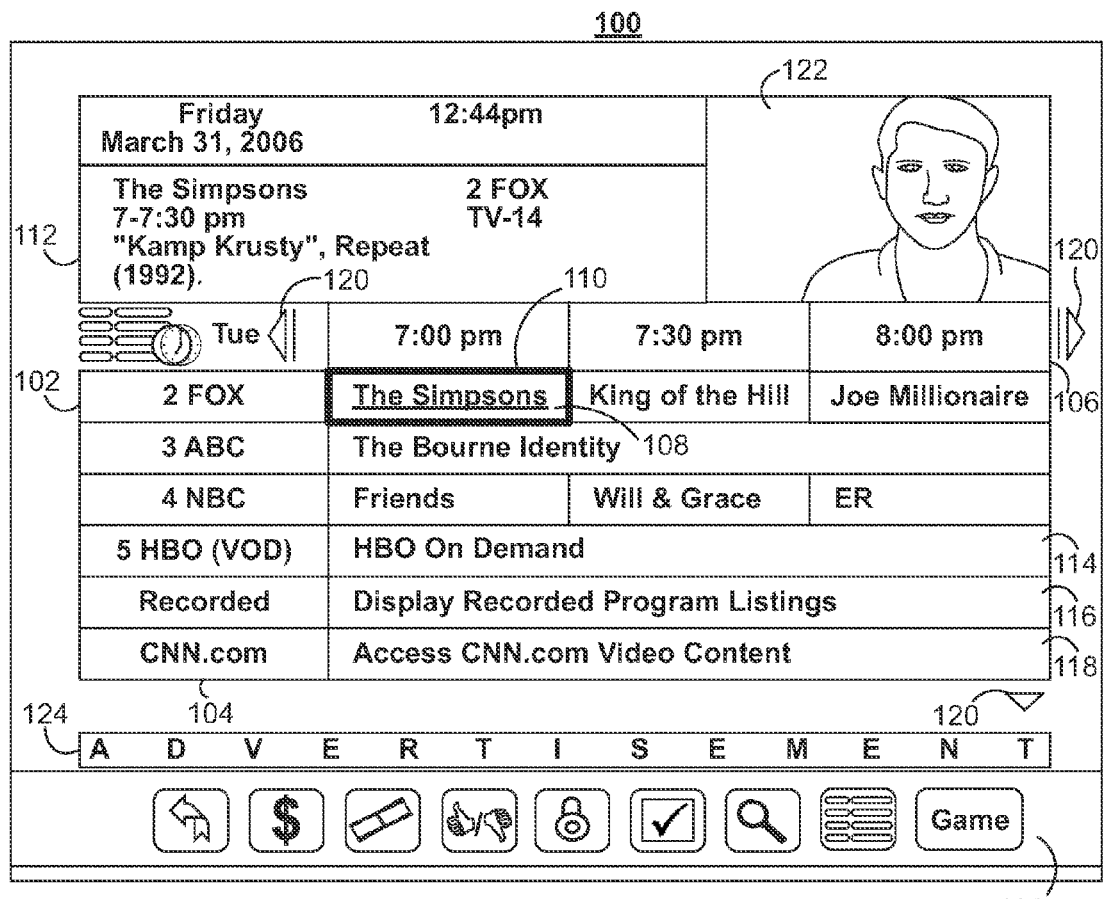
FIG. 1 shows an illustrative embodiment of a display screen that may be used to provide media guidance application listings and other media guidance information, in accordance with some embodiments of the disclosure.

Methods and systems for providing a game in an interactive media application are disclosed herein. In some embodiments, the methods and systems include using a database to identify a source individual, a destination individual, and a first group of candidates, where the first group of candidates is identified based on information that defines a relationship between the source individual and each candidate in the first group of candidates. Subsequently, media elements representative of the source individual, the destination individual, and each of the plurality of candidates may be retrieved, whereafter a display is generated that includes each of the retrieved media elements. User input may then be received, the input reflecting a selection of a media element representing one of the candidates in the group of candidates. It may then be determined whether the database defines a relationship between the selected candidate and the destination individual. If the database does define such a relationship, an alert may be generated indicating victory. If the database does not define such a relationship, the database may be used to identify a second group of candidates, where the second group of candidates may be identified based on information that defines a relationship between the selected candidate and each of the second group of candidates. In some embodiments, processing circuitry may cause the database to be accessed. In some embodiments, a user input interface may accept user input or selections. In some embodiments, speakers may allow users to interface with the media guidance application using sounds.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. Guidance applications may also allow users to access a game consistent with the Game described herein.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. For example, users may be able to locate content associated with the Game described herein. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, games associated with media content, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
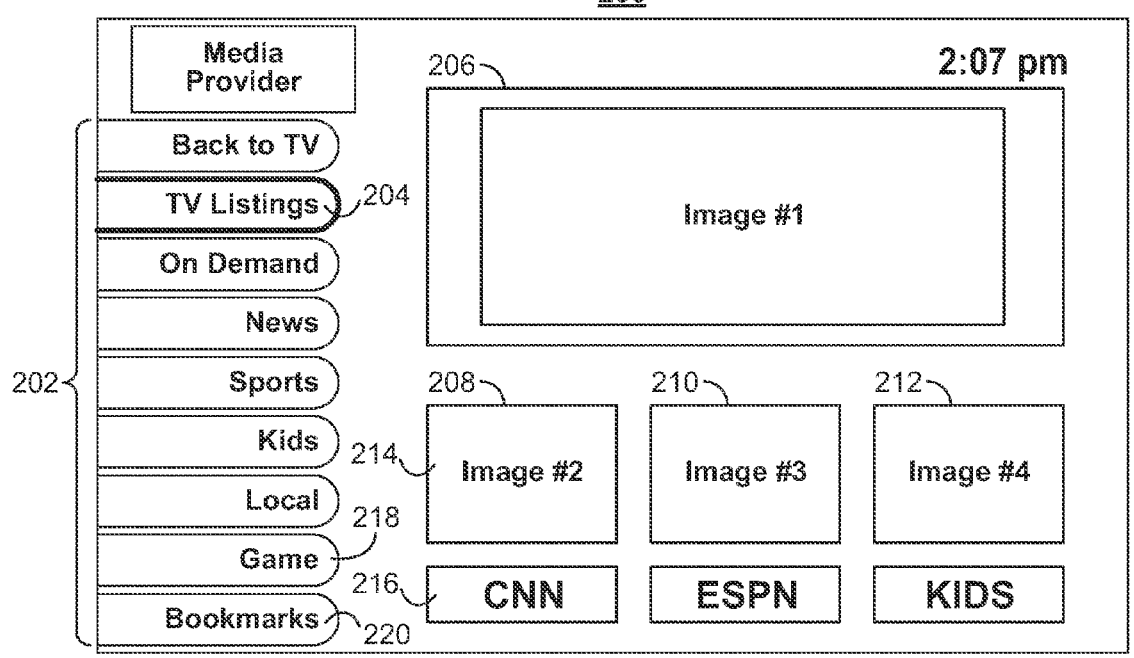
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, published Jun. 12, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, playing a game consistent with the Game described herein, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.'

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Furthermore, a user's profile information may be relied upon in tailoring a game consistent with the Game described herein based on media content to a particular user. For example, a user's profile may reflect that a user enjoys a particular actor, and that actor may be used as a source individual, a destination individual, or a candidate in the Game (as further described above and below). Additional personalized media guidance application features are described in greater detail in Ellis et al., U.S. Patent Application Publication No. 2005/0251827, published Nov. 10, 2005, Boyer et al., U.S. Pat. No. 7,165,098, issued Jan. 16, 2007, and Ellis et al., U.S. Patent Application Publication No. 2002/0174430, published Nov. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on). In display 200, Game option 218 may be selected. Such a selection may result in display 200 providing a game in accordance with FIGS. 5A-5D. In display 200, Bookmarks option 220 may be selected. Such a selection may result in display 200 providing features in accordance with FIGS. 6A-6C.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, published Jun. 17, 2010, which is hereby incorporated by reference herein in its entirety.

Figure 3:
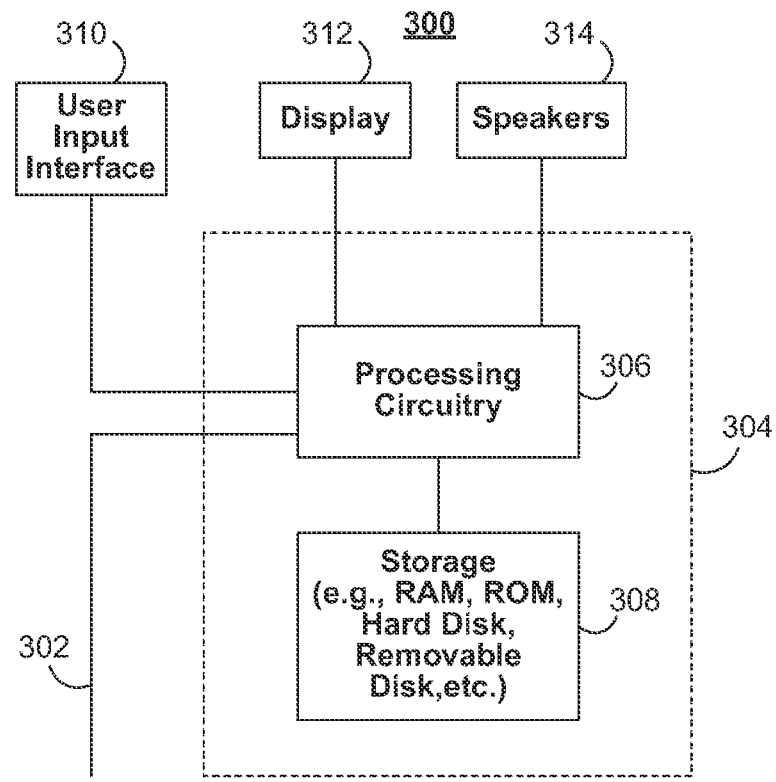
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), content associated with a game, content associated with bookmarked media, and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). In some embodiments, control circuitry 304 executes instructions for a Game. Specifically, control circuitry 304 may be instructed by the media guidance application to perform the functions discussed above and below. For example, the media guidance application may provide instructions to control circuitry 304 to generate the media guidance displays, displays associated with a game consistent with the Game described herein, and displays associated with a bookmarking feature. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
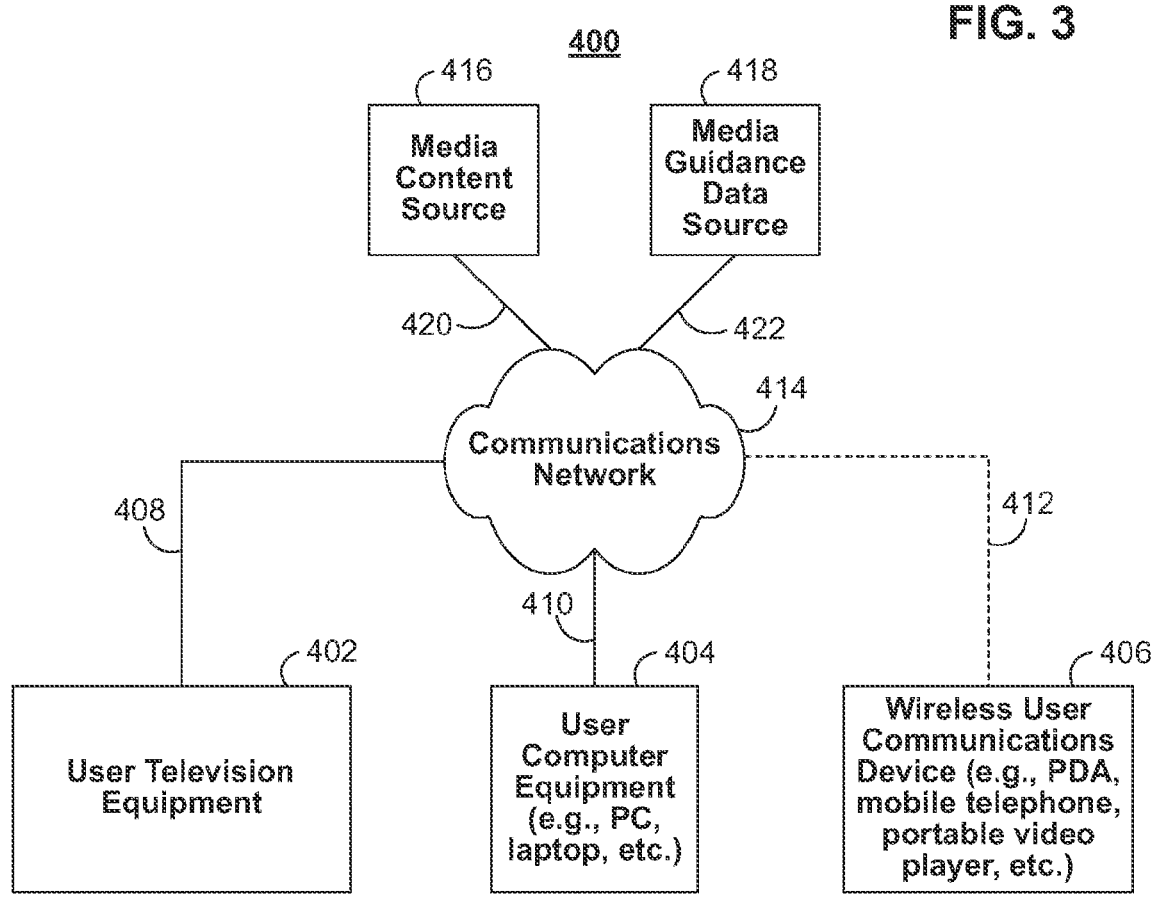
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. In some embodiments, the second screen device is configured for playing the Game in accordance with embodiments of the present invention. For example, the second screen device may be used to enable two players to simultaneously play the Game (as further described above and below). The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, customizations associated with the Game described above and below (e.g., selecting who the source individual and destination individual are, or selecting the number of candidates, as further described above and below), and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Accordingly, hereafter where reference is made solely to a media guidance data source, or solely to a content source, it is understood that such reference is merely used for convenience, and is intended to encompass either content source 416 or media guidance data source 418, or a single integrated source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Application Publication No. 2005/0251827, published Nov. 10, 2005. Different types of user equipment devices in a home network may also communicate with each other to transmit content. For example, a user may transmit content from user computer equipment to a portable video player or portable music player. As another example, user equipment devices may communicate with each other to play the Game in a multi-device environment, as described above and below.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5A:
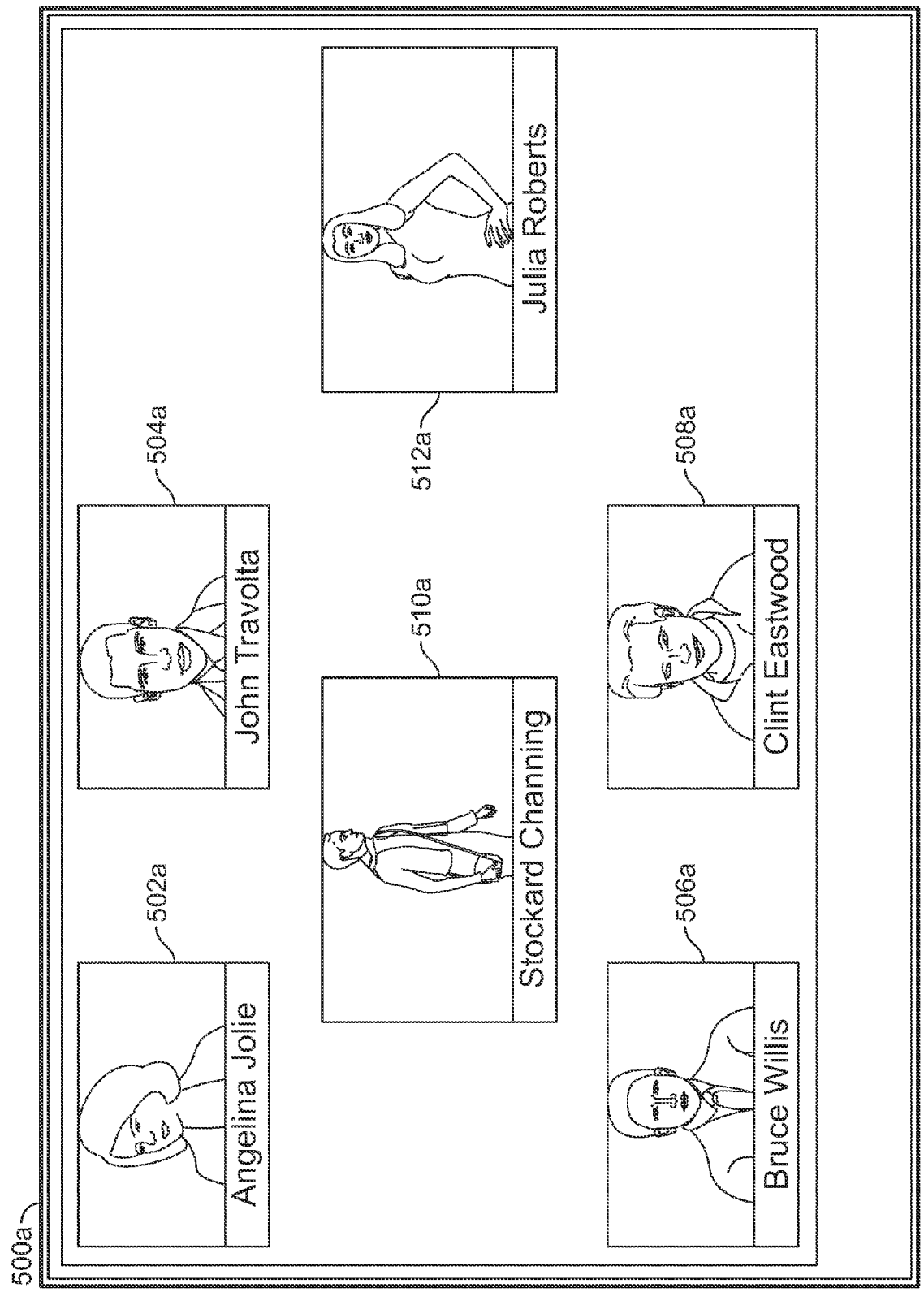
FIG. 5A shows an illustrative embodiment of a display screen of an interactive media application, which may be used to display representations of individuals associated with the Game, in accordance with some embodiments of the disclosure.

FIG. 5A shows an illustrative embodiment of a display screen of an interactive media application, which may be used to display representations of individuals associated with the Game, in accordance with some embodiments of the disclosure. The game in some embodiments is presented in response to a user selection of the 'Game' option in options region 126, or in response to selecting the 'Game' tab 218. Display 500a includes a representation of a source individual 510a and a destination individual 512a. Also displayed are representations of candidate individuals 502a, 504a, 506a, and 508a. It is noted that actual depictions of each of the source, destination, and candidate individuals are made for illustrative purposes only. These depictions are not intended to accurately reflect the appearances of the individuals indicated. In this example, the source individual 510a is Stockard Channing, the destination individual 512a is Julia Roberts, and the candidate individuals respectively comprise Angelina Jolie, John Travolta, Bruce Willis, and Clint Eastwood. While only four candidate individuals are displayed in this embodiment, the use of more or less than four candidate individuals is contemplated. In some embodiments, one or more users may select the number of candidate individuals to be displayed. In other embodiments, the number of candidate individuals to be displayed is chosen automatically, e.g., in a random fashion by processing circuitry 306.

The manner in which the source individual 510a and the destination individual 512a are selected may be automatic or selected in accordance with a user input. Examples of how the source and destination individuals may be automatically selected include selection based on programming currently being viewed, selection based on programs a user has viewed in the past, selection based on a user's profile or viewing habits, selection based on popular programming, selection based on highly-rated programming, and the like. For example, if a user is watching "Seinfeld," processing circuitry 306 may automatically access a database, such as media guidance data source 418, in order to select an actor associated with that show such as Jerry Seinfeld. It is noted that while game data is generally described in this disclosure as being accessed from a database or from media guidance data source 418, such description is merely used for convenience, and where such language is used it is intended that game data may be accessed via media content source 416, media guidance data source 418, or a separate and different source altogether. The database may be remote (e.g., server-based, and accessed via communications network 414) or local. Examples of how the source and destination individuals may be selected in accordance with a user input include selection based on a user inputting text that matches with an entry in a programming database, selection of a highlighted individual on a menu or listing, and the like (e.g., a user might highlight Jerry Seinfeld when viewing a content listing, which might cause processing circuitry 306 to access a database such as media guidance data source 418 and retrieve associated information). In one embodiment, a user might be prompted on display 312 to input a text string. The user might then input a text string using user input interface 310, which would then be processed by processing circuitry 306 and compared against data contained in a database, such as media guidance data source 418.

The manner in which the candidate individuals are selected may be automatic. Candidate individuals may be selected based on an association with the source individual. In some embodiments, a database, such as Media Guidance Data Source 418, may define associations between individuals. For example, the database may associate individuals with information of metadata related to media assets, such as the title, director, or producer of a movie that an individual performed in. In this example, a prospective candidate individual would be associated with the source individual if, for example, the prospective candidate and the source individual performed in the same movie, or if they each performed in movies that were directed by the same person. An association may be formed if metadata associated with the source individual and a prospective candidate individual in the database matches. For example, if a comparison between metadata associated with the source individual and metadata associated with the prospective candidate individual yields a commonality, then the metadata associated with each individual may be said to match. In such a case, the database defines the match as a relationship between the prospective candidate and the source individual (as further described above and below).

In some cases, a source individual may have a defined relationship with more than the number of candidates displayed. For example, while four candidates are displayed in FIG. 5A, many more than four individuals are associated with Stockard Channing in a manner that would qualify those individuals as candidates. In some embodiments, candidate individuals from a pool of prospective candidate individuals may be randomly selected by processing circuitry. In other embodiments, a degree of association may be determined by processing circuitry, where those prospective candidates with the highest degree of association may become the candidates.

In still other embodiments, a degree of association between a prospective candidate and the destination individual may be calculated. For example, it may be computed by processing circuitry how many "hops" it would take to get from a prospective candidate to the destination individual. The number of hops may be determined by first determining whether the prospective candidate has associated metadata that matches that of the destination individual in a database (e.g., a defined relationship exists through metadata between the selected candidate and the destination individual). If matching metadata exists, then it can be said that it would take only one hop to get from the prospective candidate to the destination individual. If matching metadata does not exist, then it may next be determined by using processing circuitry whether any individual who matches the prospective candidate's associated metadata also matches the destination individual's associated metadata. If this is the case, then it would take two hops to get from the prospective candidate to the destination individual. This methodology may be used in a similar manner to determine any number of hops between a prospective candidate and a destination individual.

In some embodiments, the candidates chosen to be displayed from a pool of prospective candidates may be determined based on the number of hops between each prospective candidate and the destination individual. In some embodiments, each candidate may be a different number of hops away from the destination individual. For example, in FIG. 5A, prospective candidate Bruce Willis is only one hop away from destination individual Julia Roberts because they co-starred in the movie "The Player." John Travolta, on the other hand, is two hops away, because he has not co-starred with Julia Roberts, but he is associated with Nicholas Cage, who has in fact co-starred with Julia Roberts in "The Ant Bully." In this scenario, the first hop is Nicholas Cage, and the second hop is Julia Roberts. In one embodiment encompassed by FIG. 5A, the candidates 502a, 504a, 506a, and 508a may each be a different number of hops away from destination individual 512a. In another embodiment, each candidate may be selected as being beneath a threshold number of hops. For example, it may be required that no candidate displayed be more than a certain number of hops away from the destination individual. In other embodiments, it may be required that at least one displayed candidate be exactly one hop away from the destination individual. In still further embodiments, it may be required that exactly one displayed candidate be one hop away from the destination individual.

In other embodiments, candidates may be determined in a manner consistent with FIG. 11 and as further described above and below.

In some embodiments, a user may be enabled to select the mode of relationship between the source individual and the candidates, and the mode of relationship between the candidates and the destination individual. For example, a user may desire to only view candidates, source individuals, and destination individuals who are actors or actresses that co-starred with one another. A user may similarly desire to allow for a source individual and a destination individual to be related by any form of association or collaboration, such as an actor-director relationship, directors who worked together, actors who co-starred together, producers, or even multi-person entities such as bands, or non-media entities such as political figures or friends or buddies on social networking sites and applications. In some embodiments, a user may be prompted to select customizable features on a media guidance application featured on display 312, optionally in response to a user command.

Figure 5B:
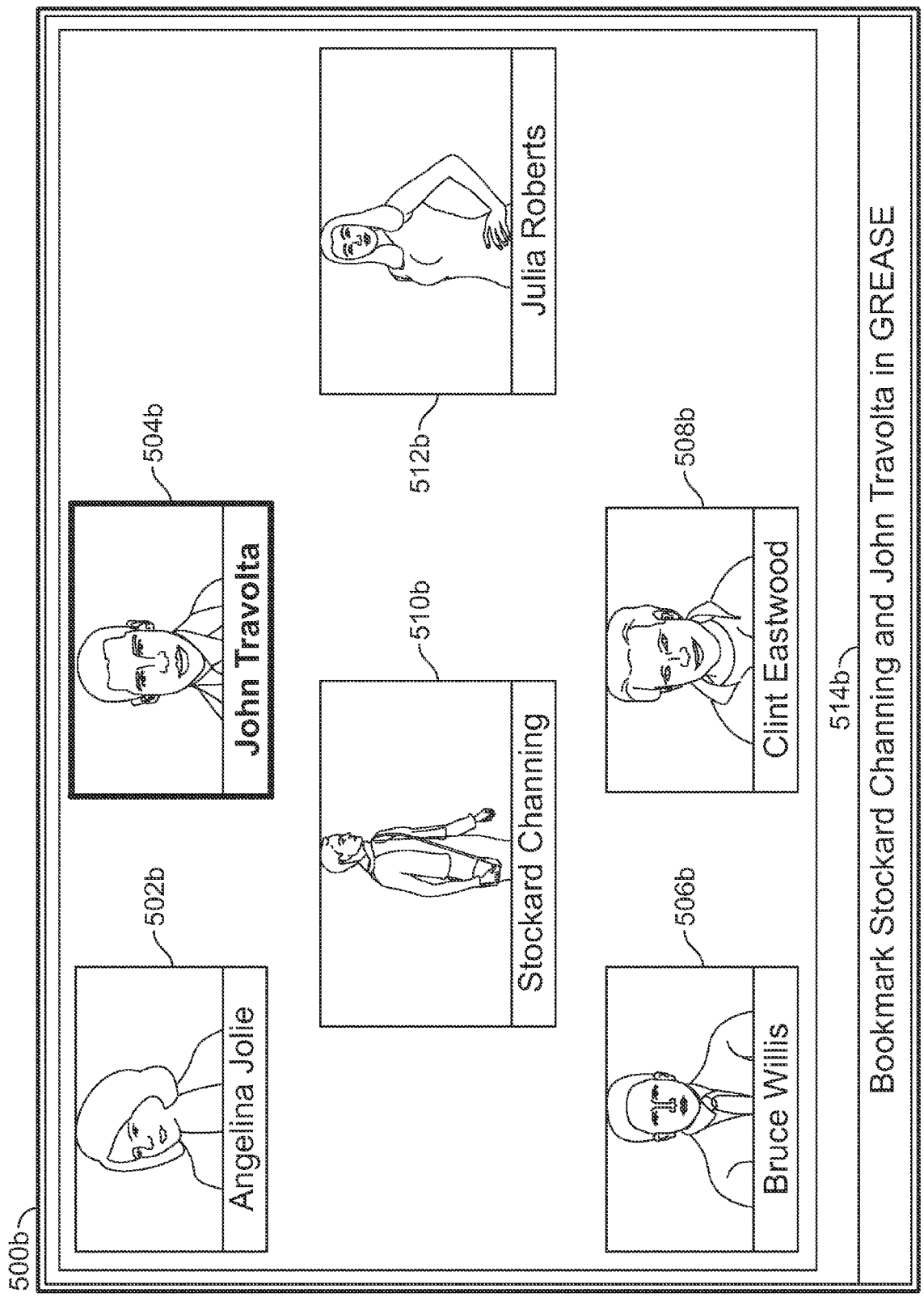
FIG. 5B shows an illustrative embodiment of a display screen of an interactive media application, which may be used to display representations of individuals associated with the Game, as well as other features such as a bookmarking feature, in accordance with some embodiments of the disclosure.

FIG. 5B shows an illustrative embodiment of a display screen of an interactive media application, which may be used to display representations of individuals associated with the Game, as well as other features such as a bookmarking feature, in accordance with some embodiments of the disclosure. In FIG. 5B, candidate 504b has been highlighted. In some embodiments, the highlighting of a candidate is in response to a user selection. Optionally, when a candidate is highlighted, bookmarking option 514b will appear. In some embodiments, bookmarking option 514 will be a user-selectable option. When a user selects the bookmarking option, a bookmarking function (as described in the immediately following paragraphs) will be performed. This user selection may be in response to a prompt portrayed on display 312. In other embodiments, a bookmarking function may be performed automatically by processing circuitry 306 upon a candidate being highlighted on display 310, or upon a candidate being selected.

The bookmarking function serves to identify and save the relationship between the source individual and the selected candidate for future use. This relationship may be stored on storage 308. Such storage may be local or remote, remote storage optionally being on a remote server, accessed via communications network 414. For example, with respect to FIG. 5B, Stockard Channing and John Travolta are related by virtue of having co-starred in the movie "GREASE." A bookmark may be stored that points to the movie GREASE, or that points to media content relating to GREASE. While only one bookmarking option is portrayed in FIG. 5B, multiple bookmarking options are contemplated by the invention. For example, if Stockard Channing and John Travolta are related in other ways, those relations may optionally be displayed and/or automatically bookmarked as well. Furthermore, while only a bookmark function is displayed in FIGS. 5B through 5D, the lack of depictions of other functions is done for convenience. In place of, or in addition to, the bookmarking option there may be another type of selectable opportunity, such as an opportunity to immediately view media content related to any displayed individual, an opportunity to immediately view media content related to the relationship between the source individual and the selected candidate, and the like. The selectable opportunity may also be a link to a vendor of physical products relating to the aforementioned media content, such as DVDs, Blu-Ray discs, action figures, and the like, or of virtual products relating to the aforementioned media content such as video-on-demand services.

Upon a candidate being selected, it will be determined whether the selected candidate matches the destination individual. In accordance with the foregoing, the manner of determining whether the selected candidate matches the destination individual may include determining by using processing circuitry 306 whether the selected candidate is one hop away from the destination individual, or whether the metadata associated with the selected candidate matches the metadata associated with the destination individual. If the selected candidate matches the destination individual, the game will end. If the selected candidate does not match the destination individual, the game will continue. In the embodiment depicted in FIG. 5B, the metadata associated with selected candidate John Travolta does not match the metadata associated with destination individual Julia Roberts, and so the game will continue.

Figure 5C:
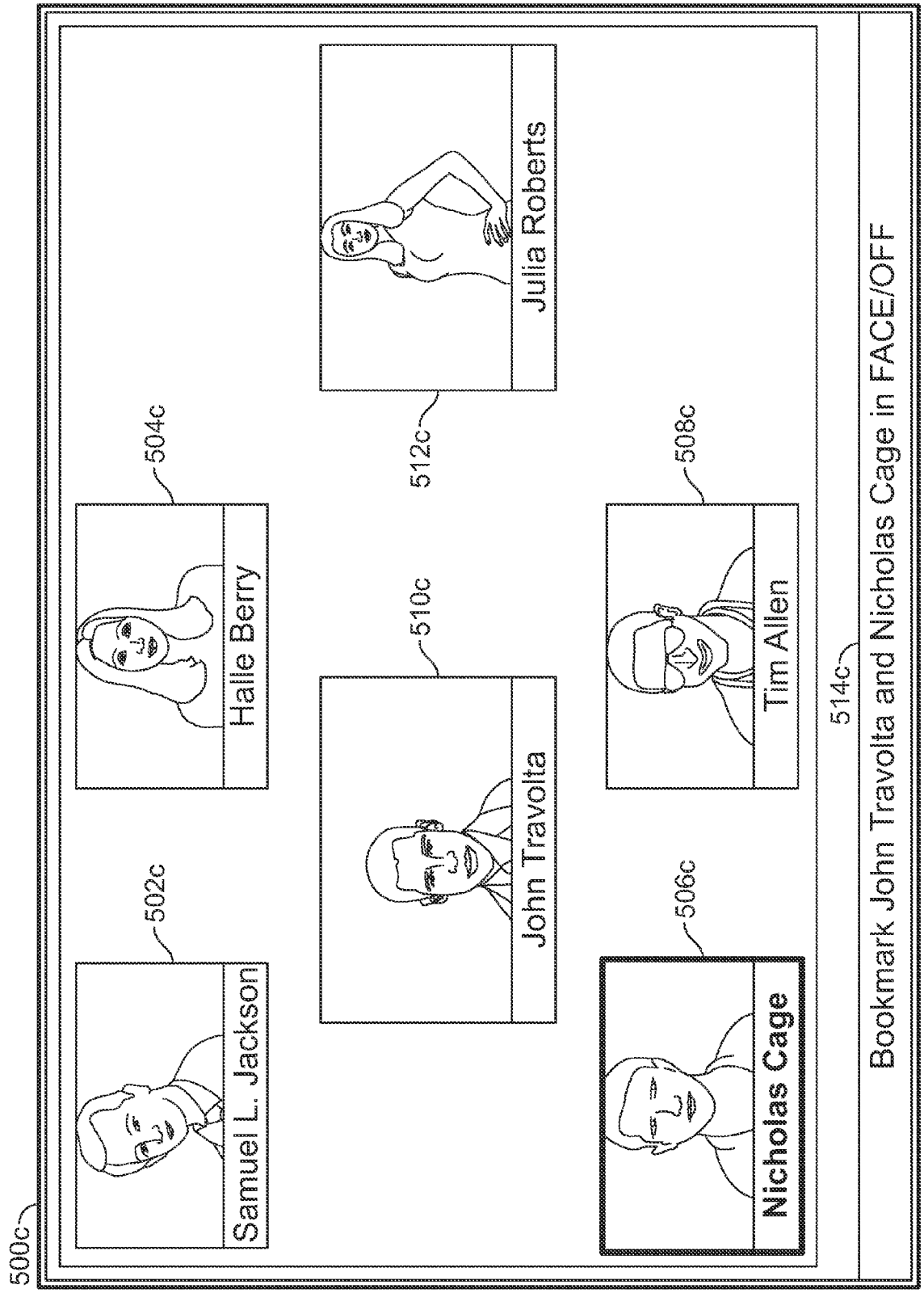
FIG. 5C shows an illustrative embodiment of a display screen of an interactive media application, which may be used to display representations of individuals associated with the Game, as well as other features such as a bookmarking feature, in accordance with some embodiments of the disclosure.

FIG. 5C shows an illustrative embodiment of a display screen of an interactive media application, which may be used to display representations of individuals associated with the Game, as well as other features such as a bookmarking feature, in accordance with some embodiments of the disclosure. In FIG. 5C, where the metadata associated with the selected candidate does not match the metadata associated with the destination individual, the selected candidate will replace the source individual. In the example portrayed in FIG. 5C, John Travolta has replaced Stockard Channing as the source individual. New candidates are generated in the same manner described with regard to FIG. 5A and FIG. 5B, except they now will relate to the new source individual (e.g., the previously selected candidate John Travolta). Each time a candidate is selected whose metadata does not match the metadata of the destination individual, the process described in this paragraph may repeat.

Similar to the process described with respect to FIG. 5A and FIG. 5B, a new candidate is selected from amongst a pool of prospective candidates. As shown in FIG. 5C, Samuel L.

Jackson, Halle Berry, Nicholas Cage, and Tim Allen have been selected as candidates 502c, 504c, 506c, and 508c. A user highlights Nicholas Cage, which may cause processing circuitry 306 to receive an indication of the highlight. Processing circuitry 306 may then update the bookmark option 514c to reflect the relationship between the source individual John Travolta, and the selected candidate Nicholas Cage. In this example, the selected candidate Nicholas Cage and the destination individual Julia Roberts have a defined relationship, at least because they co-starred in "The Ant Bully," and as such the game will end.

Figure 5D:
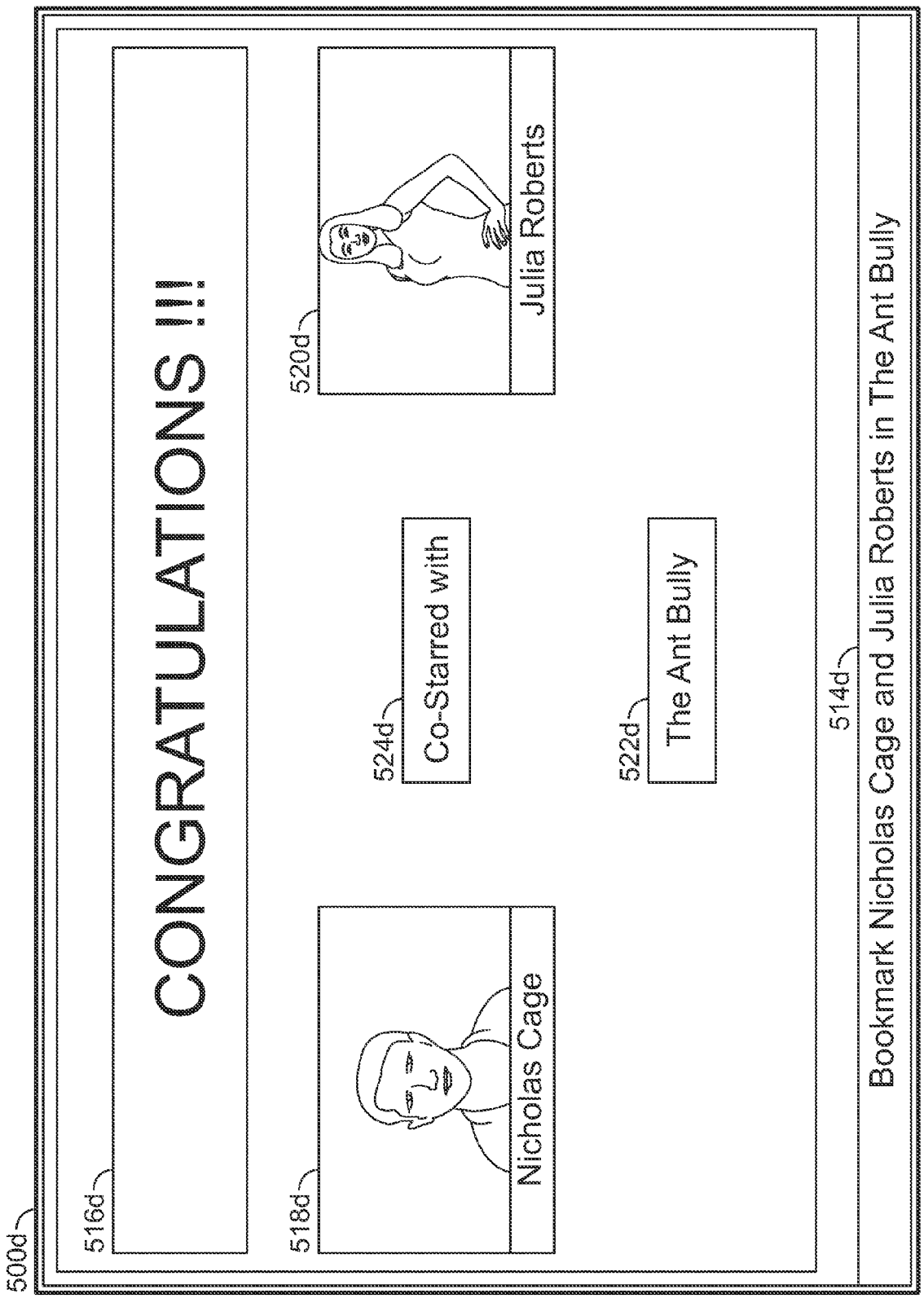
FIG. 5D shows an illustrative embodiment of a display screen of an interactive media application, which may be used to display representations of individuals associated with the game, as well as other features such as a bookmarking feature, an alert feature, and a relationship definition feature, in accordance with some embodiments of the disclosure.

FIG. 5D shows an illustrative embodiment of a display screen of an interactive media application, which may be used to display representations of individuals associated with the game, as well as other features such as a bookmarking feature, an alert feature, and a relationship definition feature, in accordance with some embodiments of the disclosure. FIG. 5D shows display 500d, which reflects how the game might look when a user selects a candidate that has a defined relationship with the destination individual. Optionally, item 516d may reflect a note of congratulations to a user. Should the game be played by two or more users, item 516d might state the note of congratulations in conjunction with the winning user's name or handle, such as "User 1" or "User 2." Items 518d and 520d optionally portray one, some, or all of the source individual, the matching selected candidate and the destination individual. Some or all of the previously selected candidates may also be displayed. All or some of the previously displayed, but unselected candidates may also be displayed. Item 514d provides a bookmarking option that acts in a manner consistent with the functionality described in the foregoing. For example, media content related to a movie the selected candidate and the destination individual participated in (e.g., "The Ant Bully") may be retrieved from media guidance data source 418, and then bookmarked by processing circuitry 306 and stored locally or remotely at storage 308.

Items 522d and 524d describe the relationship between the selected candidate and the destination individual. Item 524d describes the exact nature of the relationship. In this case, the selected candidate and the destination individual were co-stars in a movie; however, all types of relationships are contemplated, such as, but not limited to, having 'participated' in a production of a media asset (e.g., a director of a movie and a producer of that same movie, or a producer of a movie and an actress of that same movie), having created a media asset together (e.g., a song made by two musicians), and the like. Relationships that are not directed toward media relationships are also contemplated, such as co-workers, friends or buddies on social media applications, romantic partnerships, political figures, and the like. Item 522d describes the name of the media asset that forms the relationship between the selected candidate and the destination individual.

The representations included in FIGS. 5A through 5D include depictions of various shapes and sizes. These depictions are intended to be non-limiting; any representation that accomplishes the object of the invention are within the scope of the invention.

Figure 6A:
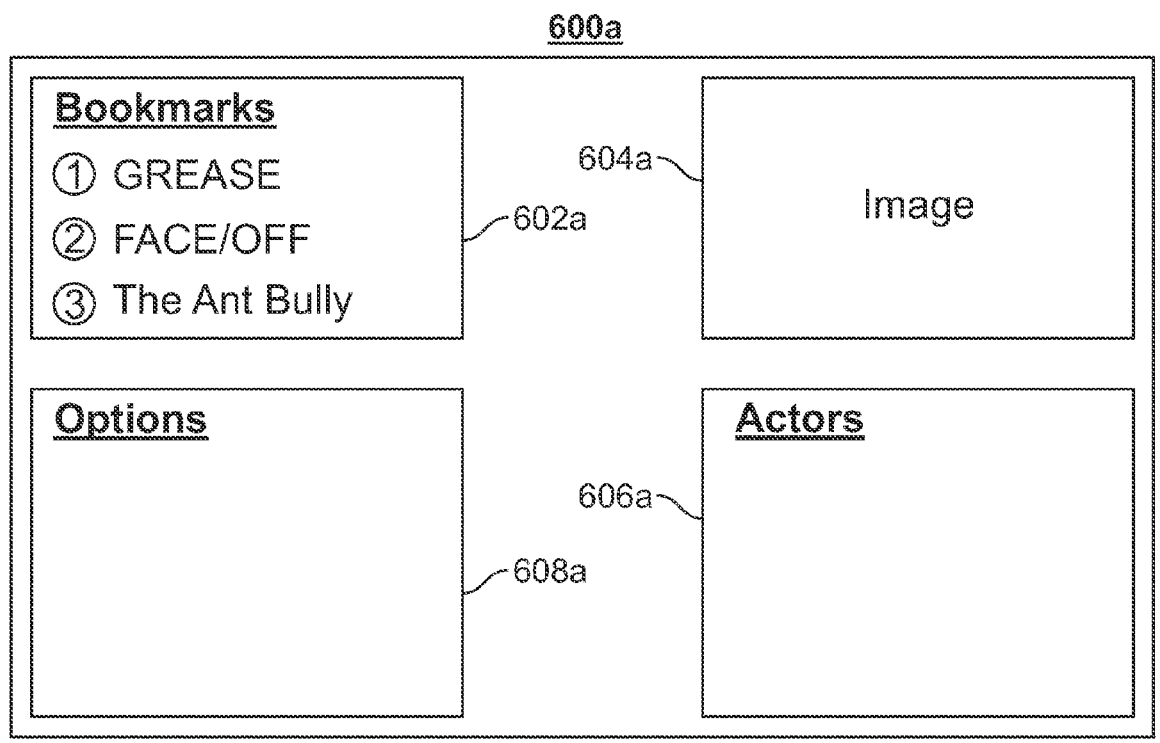
FIG. 6A shows an illustrative display screen of an interactive media application that may be used to display features associated with bookmarked media assets in accordance with some embodiments of the disclosure.

FIG. 6A shows an illustrative display screen of an interactive media application that may be used to display features associated with bookmarked media assets in accordance with some embodiments of the disclosure. FIG. 6A includes display 600a. Display 600a includes "Bookmarks" cell 602a. Optionally, display 600a is presented when a user selects "Bookmarks" option 220 in FIG. 2. In this example, display 600a reflects a list or menu that would result if each bookmark option 514b, 514c, and 514d were selected. The bookmarks cell may include a list or menu with all bookmarks ever selected by a user. The bookmarks cell may only reflect bookmarks from a most recent game played. The bookmarks cell may only list media assets that were bookmarked within a certain number of days or weeks, or may delete bookmarks that are older than a user-specified or predetermined range. The list within the bookmarks cell is optionally customizable and sortable by the user, such that a user may at least delete bookmarked media assets or sort bookmarked assets by criteria, such as alphabetically or based on how recently a media asset has been bookmarked. Items that may appear in the bookmarks list include the asset that forms the defined relationship between the selected candidate and the destination individual (e.g., "The Ant Bully" in the example of FIG. 5D), and may also include any content related in any way to the selected candidate, the destination individual, or the media asset itself (e.g., other actors, producers, or staff involved in the production of "The Ant Bully," other movies the selected candidate or the destination individual may have performed in, and the like).

Figure 6B:
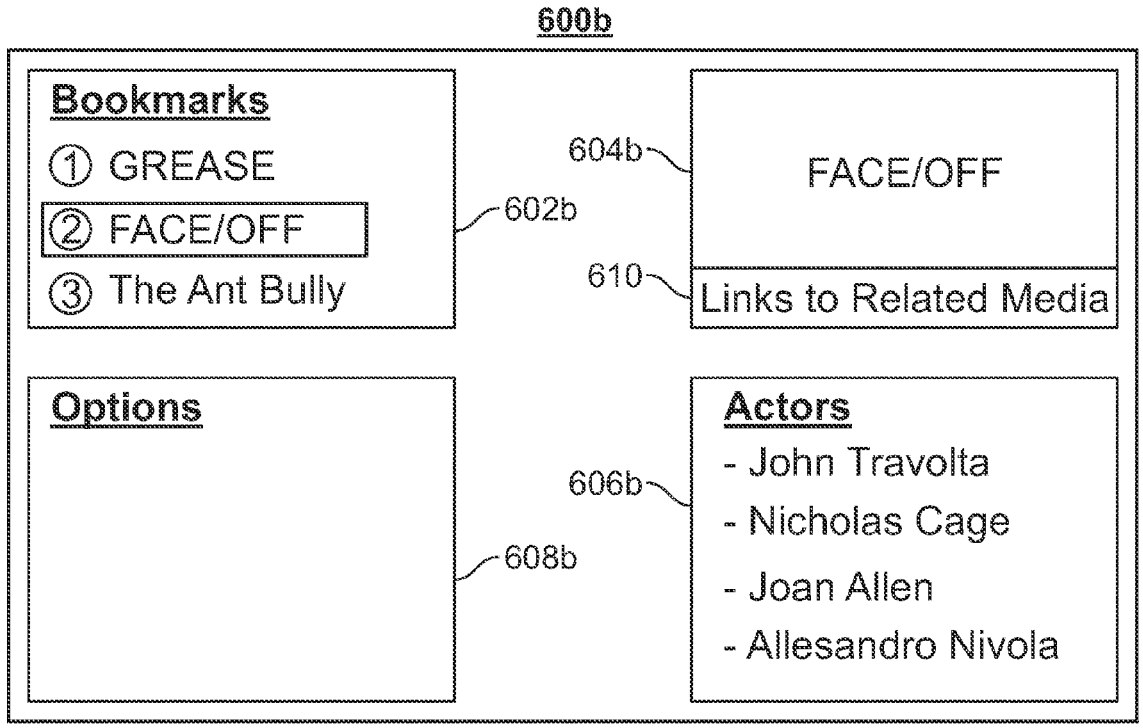
FIG. 6B shows an illustrative display screen of an interactive media application that may be used to display features associated with bookmarked media assets, including an Actors feature, in accordance with some embodiments of the disclosure.
Figure 6C:
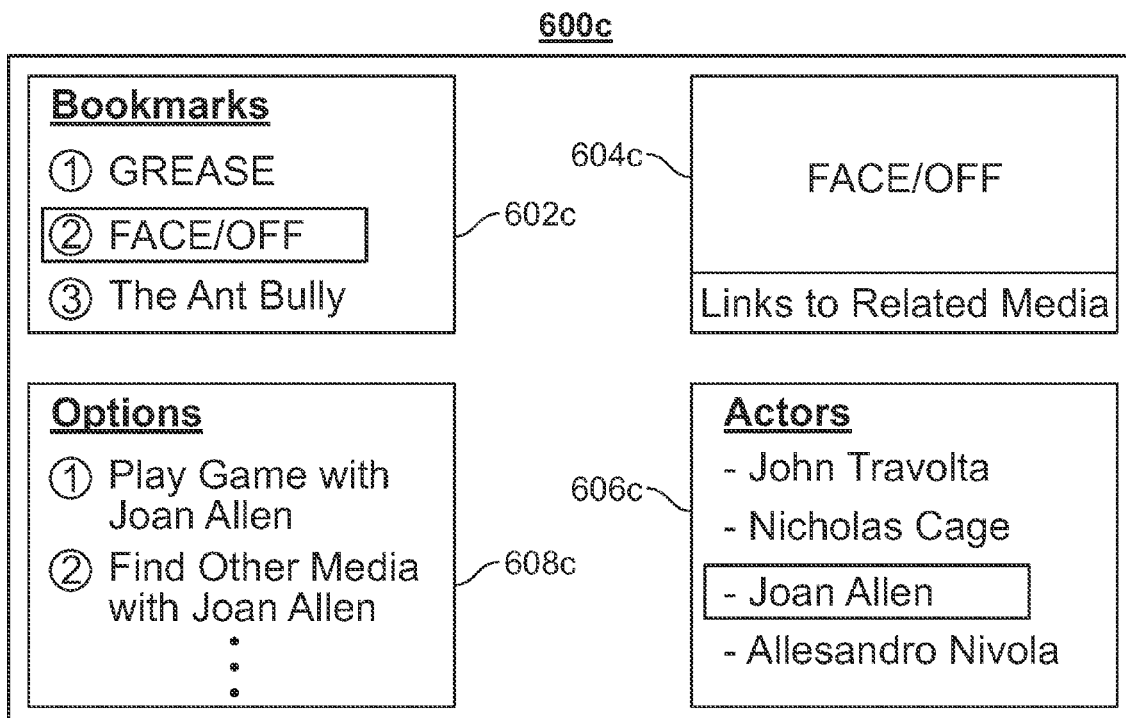
FIG. 6C shows an illustrative display screen of an interactive media application that may be used to display features associated with bookmarked media assets, including an Options feature, in accordance with some embodiments of the disclosure.

FIG. 6B shows an illustrative display screen of an interactive media application that may be used to display features associated with bookmarked media assets, including an Actors feature, in accordance with some embodiments of the disclosure. In the example of FIG. 6B, a user may select a bookmarked media asset. In this case, a user has selected "FACE/OFF." Cell 604b may present media content associated with the media asset. This may include the media asset itself, an advertisement related to the media content, a trailer, or any other type of media content. Item 610b may optionally provide links to related media. These links may be Internet links, or may link to locally-stored programming.

An Actors region may be presented in cell 606b. The term "Actor" is used for convenience, and should be understood to include any person or entity within the scope of the invention, and the person or entity presented in the Actors region need not have been an actor in a movie. Examples of persons or entities that may be considered "Actors" include those who may form relationships as described above and below. Actors displayed in cell 606b are optionally related to the user-selected media asset. For example, in cell 606b, the main actors of the movie "FACE/OFF" are presented. These assets are optionally user-selectable. Looking ahead to FIG. 6C, Actors cell 606c reflects that a user has selected Joan Allen. Options screen 608c is then populated with options relating to the selected actor. These options may optionally include, but are not limited to, allowing for a user to initiate a new Game using the selected individual (e.g., Joan Allen) as either the source individual or the destination individual, searching for media assets including Joan Allen as an actress, and the like.

Figure 7:
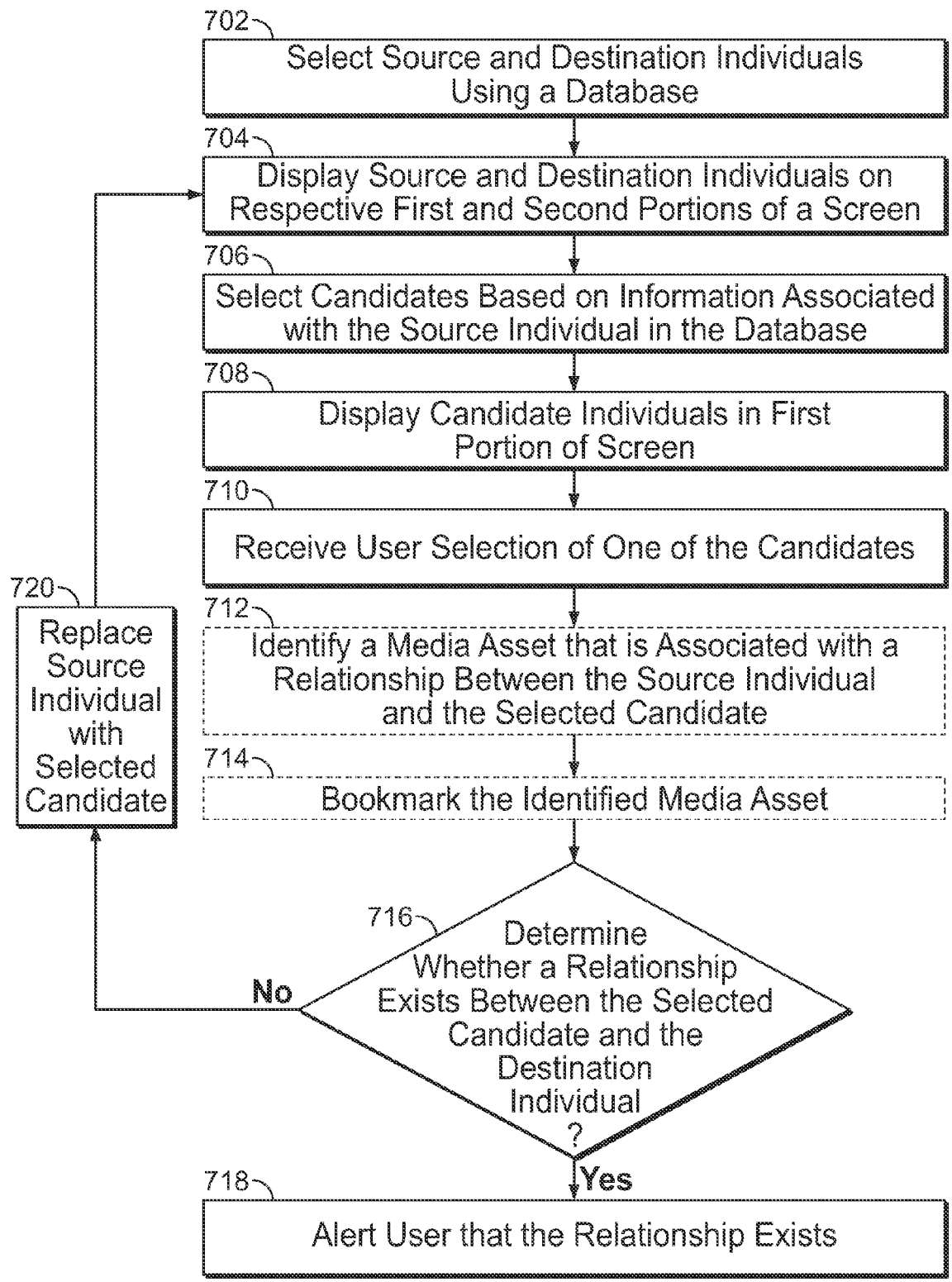
FIG. 7 is a flowchart of illustrative steps involved in using an interactive media application to display features pertaining to the Game in accordance with some embodiments of the disclosure.

FIG. 7 is a flowchart of illustrative steps involved in using an interactive media application to display features pertaining to the Game in accordance with some embodiments of the disclosure. The steps of the flow chart are not limiting, as further steps may be performed, and some steps may be optional. In step 702, source and destination individuals are selected using a database. This selection may be performed automatically, or by user input. In the event of user input, a user may be prompted on display 312 to enter a text string via user input interface 310. The text string may be processed by processing circuitry 306 and communicated over communications network 414 to media guidance data source 418 to select an individual that is related to the text string. In the event of automatic selection, processing circuitry 306 may be used to identify media content that is currently being viewed by a user, and may access media guidance data source 418 over communications network 414 to determine source and destination individuals. In step 704, the source and destination individuals are displayed on respective portions of a television screen. In one embodiment, the source individual might be displayed on the left side of the screen, and the destination individual might be displayed on the right side of the screen.

In step 706, candidates are selected from a pool of prospective candidates based on information associated with the source individual in the database. As described in the foregoing, the associated information may include metadata of a prospective candidate matching that of the source individual. For example, processing circuitry 306 may access media guidance data source 418 to determine whether a prospective candidate co-starred in a movie with a source individual. The associated information may also include a number of hops between the prospective candidate and the destination individual. In step 708, representations of the selected candidates are optionally displayed in the portion of the screen that the source individual is displayed in. The candidates may be displayed so as to surround the source individual. In other embodiments, the candidates may appear between the source individual and the destination individual.

In step 710, a user selection of one of the candidates is received. A user may cause this selection to be received by using user input interface 310 to highlight a candidate, such that processing circuitry 306 receives an indication of the highlighting. Optionally, step 712 identifies a media asset associated with a relationship between the source individual and the user-selected candidate. For example, if the source individual is Stockard Channing and the selected candidate is John Travolta, the movie GREASE may be identified. Optionally, step 714 will allow for the identified media asset to be bookmarked. In step 716, a determination will be made as to whether a defined relationship exists between the selected candidate and the destination individual. This determination may be made by way of the processing circuitry 306 accessing media guidance data source 418 in order to determine whether the selected candidate and the destination individual are associated with matching metadata, or it may be made by determining the number of hops between the selected candidate and the destination individual, as described in the foregoing. If such a relationship does exist, in step 718 a user will be alerted as to this relationship on display 312, such as in a "Congratulations" message like item 516d consistent with FIG. 5D. If a relationship does not exist, then in step 720 the source individual is replaced with the selected candidate. For example, processing circuitry may cause the source individual to be removed from display 312, and may cause the selected candidate to appear in the place of the source individual. In the example of FIG. 5C, John Travolta has replaced Stockard Channing, consistent with this step.

Figure 8:
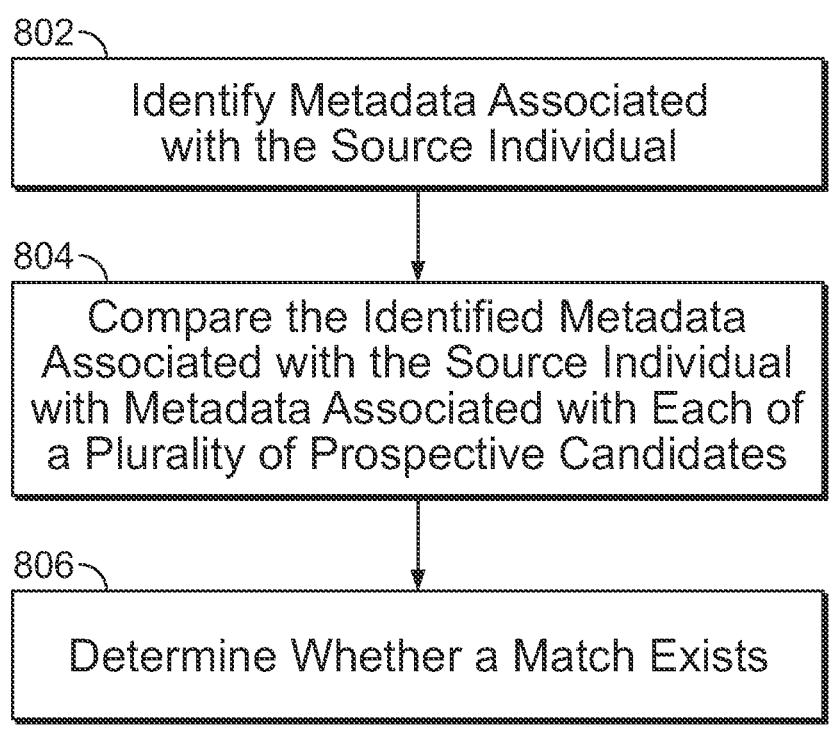
FIG. 8 is a flowchart of illustrative steps involved in using an interactive media application to determine candidates to be displayed in the Game in accordance with some embodiments of the disclosure.

FIG. 8 is a flowchart of illustrative steps involved in using an interactive media application to determine candidates to be displayed in the Game in accordance with some embodiments of the disclosure. The flow chart of FIG. 8 describes how relationships between candidates and the source and destination individuals are defined. In step 802, metadata associated with the source individual is identified. This may include any media relationship, such as movies the source individual performed in, bands the source individual played in, actors the source individual co-starred with, directors the source individual worked with, and the like. This may also include any non-media relationship, such as relationships between friends or buddies on social media applications, political figures one is associated with, entrepreneurs one has worked with or is associated with, and the like.

In step 804, the identified metadata associated with the source individual is compared to metadata associated with each of a plurality of prospective candidates, and in step 806, it is determined whether a match exists. Metadata associated with source individuals, prospective candidates, and destination individuals may be stored in media guidance data source 418 and may include fields related to both media and non-media content, such as titles of movies or television shows one has starred in, producers one has worked with, universities one has given talks at, political associations one is involved in, and/or any other association. In one exemplary embodiment, the determination as to whether a match exists may involve comparing metadata regarding movies a source individual and a prospective candidate have performed in. If a prospective candidate co-starred in the same movie as the source individual, then a match may be determined.

Figure 9:
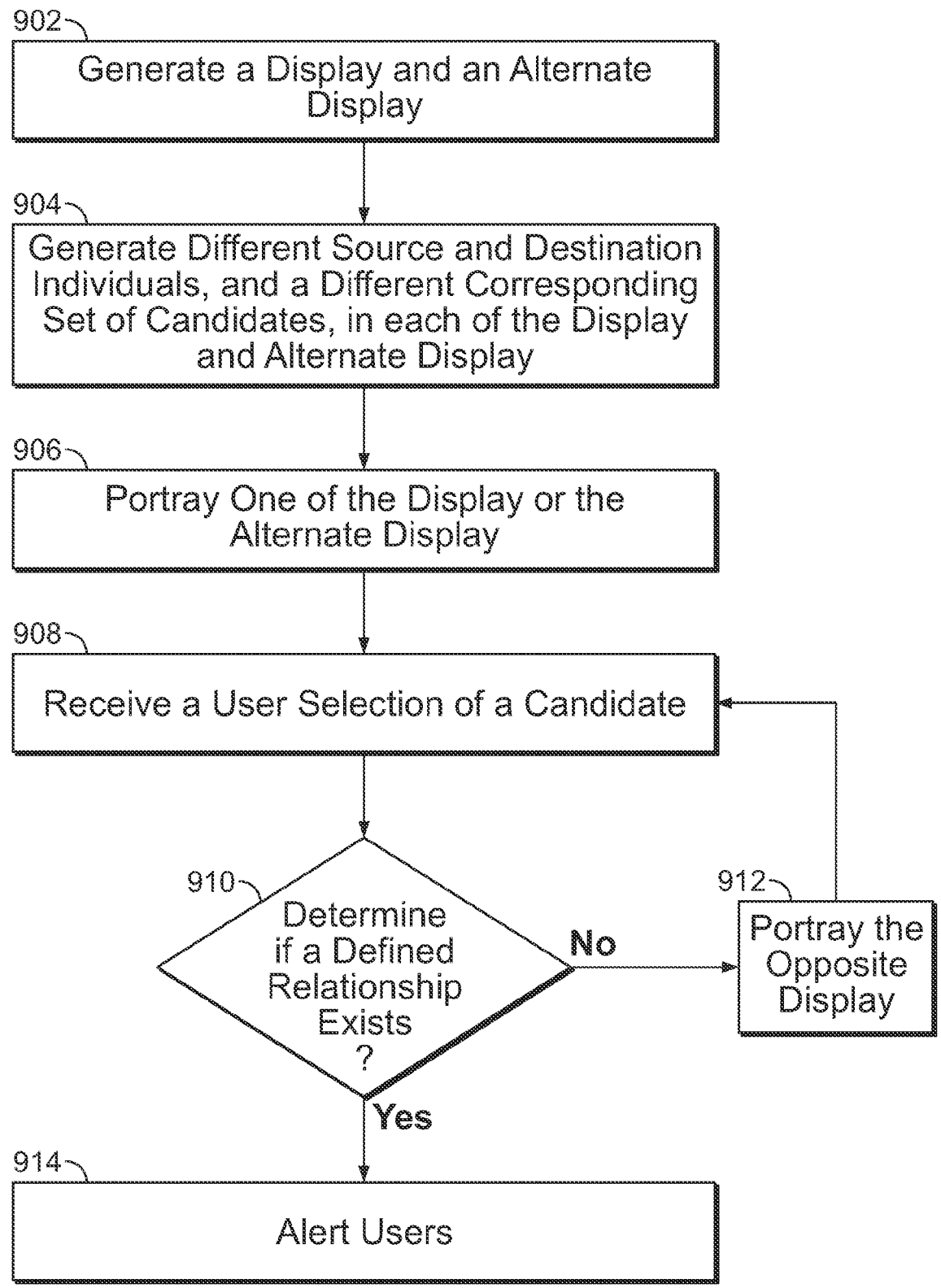
FIG. 9 is a flowchart of illustrative steps involved in using an interactive media application to enable the Game to be played by a plurality of players by using alternate displays in accordance with some embodiments of the disclosure.

FIG. 9 is a flowchart of illustrative steps involved in using an interactive media application to enable the Game to be played by a plurality of players by using alternate displays in accordance with some embodiments of the disclosure. FIG. 9 describes an embodiment that allows for two players to play on a turn-by-turn basis. While the flow chart of FIG. 9 only describes a mechanism that allows for two players, the notion of three or more players participating is contemplated by the invention.

In step 902, a display and an alternate display are generated. In one embodiment, each display may be portrayed on a screen of a user equipment side-by-side. Optionally, each display may be portrayed on the screen on an alternating, turn-by-turn basis. In an alternate embodiment, each user has his or her own display and, each display may be portrayed on separate user equipment (e.g., on a television or a mobile device such as a cellular telephone).

In step 904, two sets of source and destination individuals are generated, along with corresponding sets of candidates. A first such set corresponds to a first display, and a second such set corresponds to an alternate display, where the first different set is generated in the first display, and the second different set is generated in the alternate display. In step 906, one of the aforementioned first display or alternate display are portrayed. This portrayal corresponds to whose turn it is. In one embodiment, the person whose turn it is may be determined randomly by processing circuitry 306. In another embodiment, the players may determine the turn order. The players may be prompted to choose whether they would like to determine the turn order, or have it be done automatically, by a prompt appearing on display 312. The users may make their selection by using user input interface 310, whereafter processing circuitry 306 may process the selection and enable the chosen turn order, or determine the turn order automatically.

In step 908, a user selection of a candidate associated with the portrayed display is received. The user selection may be made by using user input interface 310. In step 910, it is determined whether a defined relationship exists between the user-selected candidate and the destination individual. Consistent with the foregoing, this relationship may be determined using processing circuitry 306 based on information or metadata associated with the user-selected candidate and the destination individual in a database, such as media guidance data source 418. In step 912, if a defined relationship does not exist, then the alternate display (i.e., the one of the display and the alternate display that is not currently portrayed) will be caused to be portrayed, optionally by processing circuitry 306. In an embodiment including three or more players, a display associated with the next player would be portrayed in a similar manner. In step 914, if a defined relationship does exist, the users will be alerted. In some embodiments, the alert may comprise a congratulatory message, such as message 516d, and the congratulatory message may be directed toward a specific victorious user.

Figure 10:
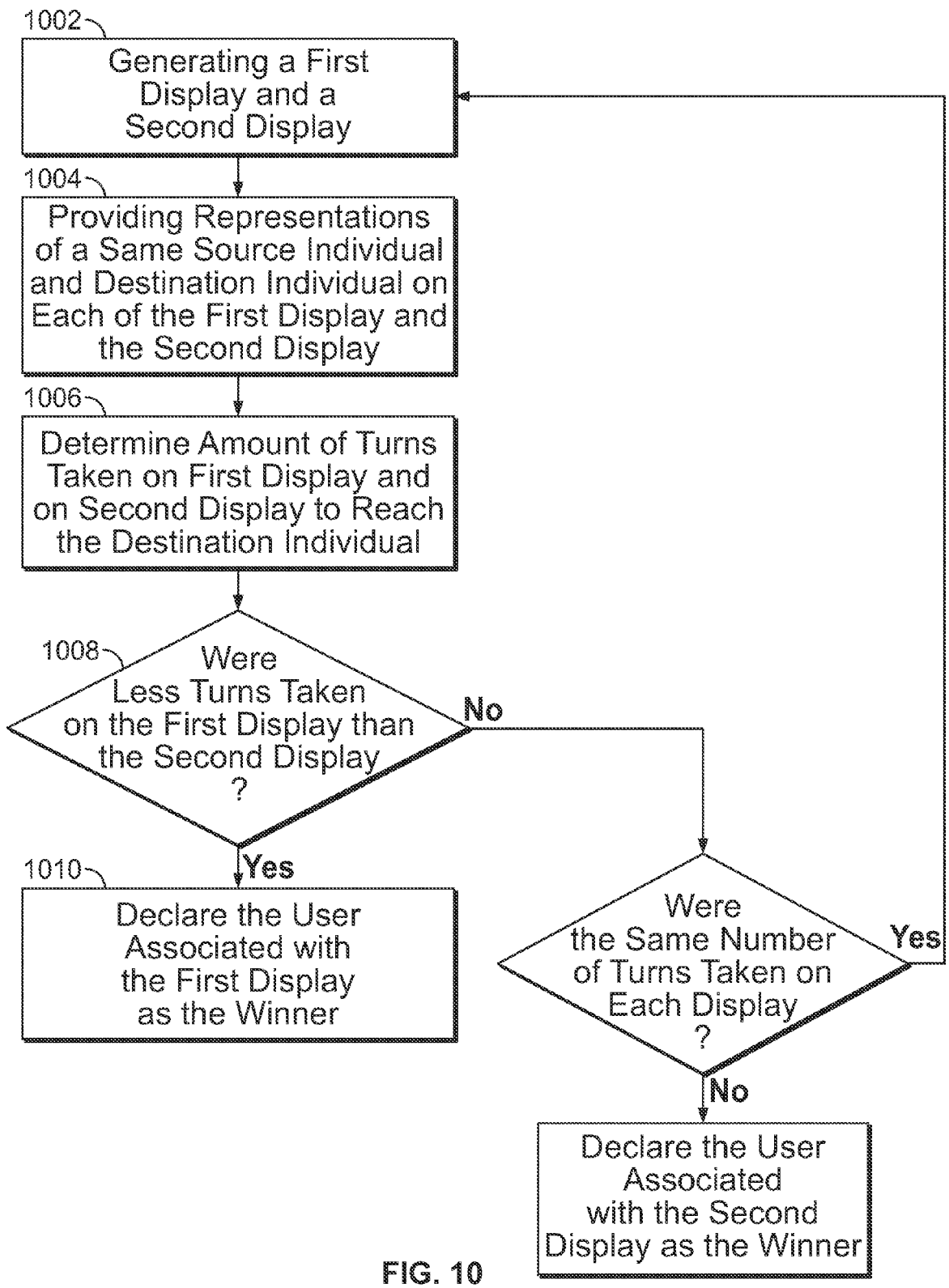
FIG. 10 is a flowchart of illustrative steps involved in using an interactive media application that enables players to play a "race" version of the Game in accordance with some embodiments of the disclosure.

FIG. 10 is a flowchart of illustrative steps involved in using an interactive media application that enables players to play a "race" version of the Game in accordance with some embodiments of the disclosure. In this embodiment, two players enjoy the game with the goal being to use the fewest amount of hops to travel from the source individual to the destination individual (e.g., the winner is the player who connects the source individual and the destination individual using the fewest degrees of separation). While FIG. 10 only discusses a two-player embodiment, embodiments including three or more players are contemplated as well, and such embodiments may be applied in a similar fashion.

In step 1002, a first display and a second display are generated. Representations of the source individual and the destination individual are portrayed on both the first display and the second display in step 1004. Subsequently, the players will select candidates by using user input interface 310 until a selected candidate has a defined relationship with the destination individual. Optionally, a counter may be stored in storage 308 that initializes when a new game is begun, and increments each time a candidate is selected. Optionally, a plurality of counters may be stored, such that each counter of the plurality of counters corresponds to a participating player.

In step 1006, it will be determined by processing circuitry 306 how many turns each player used before a selected candidate was chosen that had a defined relationship with the destination individual. This determination may be made by the processing circuitry determining the value of a counter corresponding to each player. In step 1008, it is determined whether less turns were taken on the first display than on the second display. This may be performed by the processing circuitry 306 comparing the value of each player's counter. If less turns were taken on the first display than on the second display (e.g., the counter associated with the first display or first player has a lower value than a counter associated with a second display or second player), then the user associated with the first display will be declared the winner, as per step 1010. If the condition of step 1008 is not satisfied, it is then determined in step 1012 whether the same number of turns were taken on each display. This may be performed by processing circuitry 306 determining whether the counter values associated with each display are equal. If the number of turns taken on each display are not equal, then the user associated with the second display is declared the winner as per step 1014. Otherwise, the game will begin anew at step 1002 (e.g., a tie game has occurred, and the game must be played again to determine a winner). Optionally, in the event of a tie game, users may be prompted by display 312 to select whether they wish to play again. Optionally, the determination to start the game over at step 1002 may occur automatically and without user input.

Figure 11:
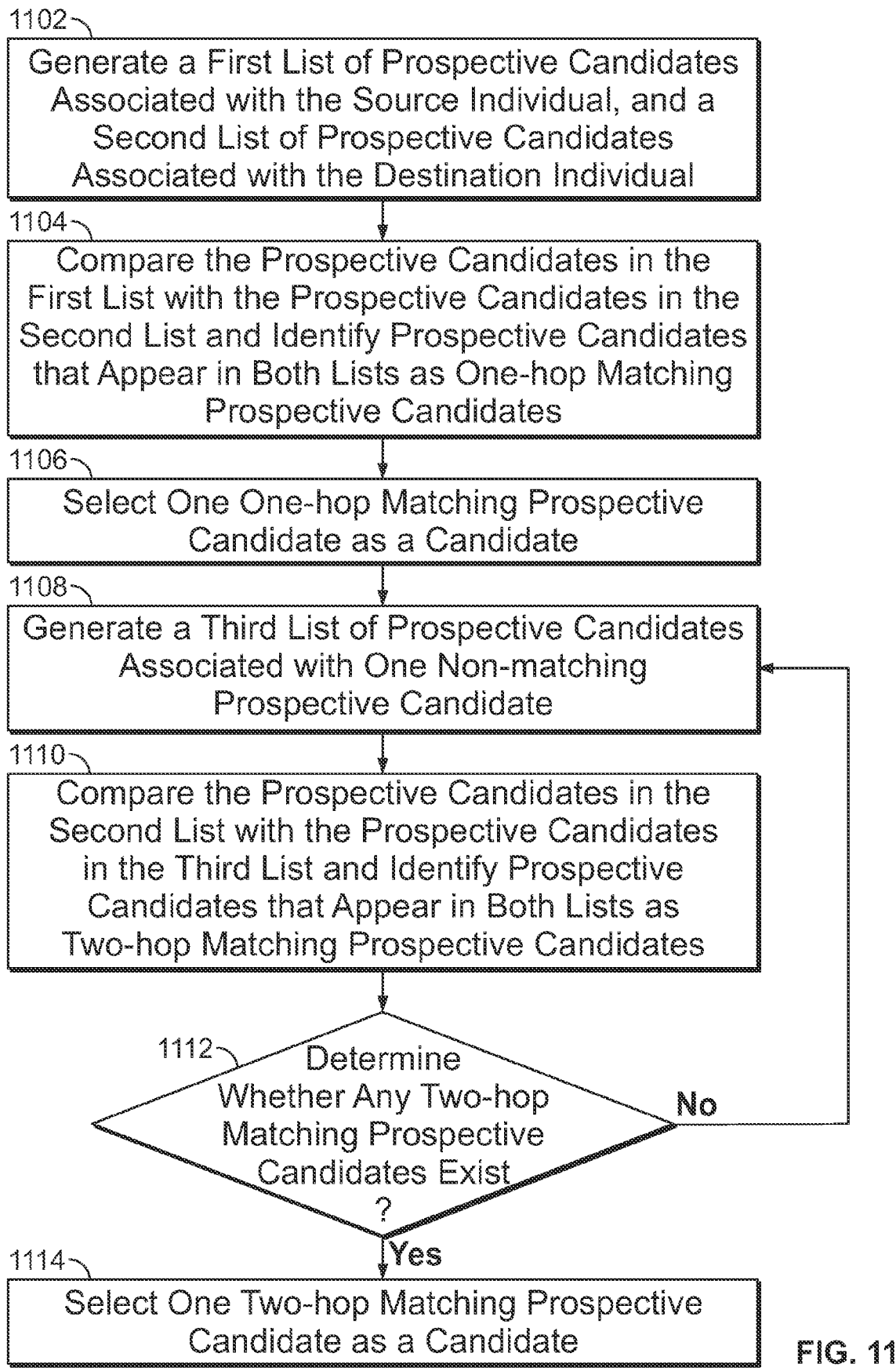
FIG. 11 is a flowchart of illustrative steps involved in using an interactive media application to determine candidates to be displayed in the Game in accordance with some embodiments of the disclosure.

FIG. 11 is a flowchart of illustrative steps involved in using an interactive media application to determine candidates to be displayed in the Game in accordance with some embodiments of the disclosure. The embodiment of FIG. 11 is directed to ensuring that the candidates displayed actually link the source individual and the destination individual by a short number of hops (e.g., If N candidates are displayed, no candidate will be more than N degrees of separation away from the destination individual.

In step 1102, processing circuitry may be used to generate a first list of prospective candidates associated with the source individual, and a second list of prospective candidates associated with the destination individual. The lists may be populated with information from a database, such as media guidance data source 316. In step 1104, the prospective candidates in the first list may be compared with those in the second list, and prospective candidates that appear in both lists are identified as matching prospective candidates (e.g., candidates that are separated by only one degree of separation). The term "one-hop matching prospective candidate" refers to a prospective candidate that is one hop away from the destination individual. In step 1106, one one-hop matching prospective candidate is selected as a candidate. This serves the purpose of both avoiding making the game too easy (as at any given time, only one displayed candidate will lead to victory), and avoiding making the game too hard (as, even if a user does not recognize the candidates displayed, the user has a reasonable probability of stumbling upon victory). For example, as applied to FIG. 5A, a user would have a 25% probability of selecting a candidate that has a defined relationship with the destination individual, as there four candidates displayed, and only one is one degree of separation away from the destination individual. It is contemplated that, in other embodiments, more than one one-hop matching prospective candidate may be selected as a candidate.

In step 1108, a third list of prospective candidates associated with one or more non-matching prospective candidates (e.g., a prospective candidate that appeared on the first list, but did not appear on the second list) is generated by processing circuitry. The third list is compared, by using processing circuitry, with the second list in step 1110, and if any prospective candidates appear in both lists then those prospective candidates are identified as two-hop matching prospective candidates (e.g., candidates that are separated by exactly two degrees of separation). It is then determined whether any two-hop matching prospective candidates exist in step 1112, and if so, a two-hop matching prospective candidate is selected as a candidate. It is contemplated that, in other embodiments, more than one two-hop matching prospective candidate may be selected as a candidate. If no two-hop matching prospective candidates exist, steps 1108-1112 are repeated using a different non-matching prospective candidate in each instance. In some instances, a list of used non-matching prospective candidates may be stored in storage 308 to ensure those used non-matching prospective candidates are not again relied upon for the generation of the third list.

Steps 1108-1112, in conjunction with steps 1102-1106, serve the purpose of ensuring that at least one candidate is one hop away from the destination individual, and that at least one candidate is two hops away from the destination individual. FIG. 11 is intended to be extensible for N candidates (or, in other embodiments, more than N candidates), N being the number of candidates displayed in the Game, whereby the candidates displayed are each a different number of hops away from the destination individual, but no candidate displayed is more than N hops away from the destination individual.

It will be apparent to those of ordinary skill in the art that methods involved in the present invention may be embodied in a computer program product that includes a computer usable and/or readable medium. For example, such a computer usable medium may consist of a read only memory device, such as a CD-ROM disk or conventional ROM devices, or a random access memory, such as a hard drive device or a computer diskette, having a computer readable program code stored thereon. It should also be understood, that methods, techniques, and processes involved in the present invention may be executed using processing circuitry. For instance, generation or selection of source individuals, destination individuals, or candidates, and other facets of the Game described herein may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 108 or one of servers 122 of FIG. 1. The source individuals, destination individuals, or candidates may be generated from user profiles stored in, and retrieved from, storage 308 of FIG. 3, or media guidance data source 418 of FIG. 4. Furthermore, processing circuitry, or a computer program, may update the profiles by updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method of providing a game in an interactive media application, comprising:
   accessing a database to identify a source individual, a destination individual, and a first plurality of candidates, wherein the first plurality of candidates is identified based on information that defines a relationship between the source individual and each of the first plurality of candidates;
   retrieving media elements representative of the source individual, the destination individual, and each of the first plurality of candidates;
   generating a display including each of the retrieved media elements;
   receiving, by user input, a selection of a media element representing one of the first plurality of candidates;
   determining whether the database defines a relationship between the selected candidate and the destination individual; and
   identifying a second plurality of candidates using the database based on information that defines a relationship between the selected candidate and each of the second plurality of candidates when the database does not define a relationship between the selected candidate and the destination individual.

2. The method of claim 1, further comprising:
   identifying a media asset associated with the relationship between the source individual and the selected candidate; and
   generating a selectable opportunity associated with the identified media asset.

3. The method of claim 2, wherein the at least one selectable opportunity comprises at least one of:
   a link to view the identified media asset,
   an advertisement related to the identified media asset, and
   a link to view media content associated with the identified media asset.

4. The method of claim 1, further comprising:
   identifying a media asset associated with the relationship between the source individual and the selected candidate;
   bookmarking the identified media asset; and
   generating a representation of the bookmarked media asset for the display.

5. The method of claim 4, further comprising:
   generating a list of bookmarked media assets;
   receiving, by user input, an indication; and
   generating a display that provides the list of bookmarked media assets in response to receiving the indication.

6. The method of claim 1, further comprising determining the first plurality of candidates by:
   retrieving metadata associated with the source individual from the database;
   comparing the identified metadata associated with the source individual with metadata associated with each of a plurality of prospective candidates;
   determining whether the metadata associated with the source individual matches the metadata associated with each of the plurality of prospective candidates.

7. The method of claim 1, wherein when the database does not define a relationship between the selected candidate and the destination individual, the method further comprising:
   replacing the source individual with the selected candidate.

8. The method of claim 1, wherein the game is played by two or more users, the method further comprising:
   providing each user with a respective source individual, destination individual, and plurality of candidate individuals;
   receiving, from each user by user input, a selection of a media element representing one of the plurality of candidates provided to each respective user; and
   generating an alert indicating which user has won the game.

9. The method of claim 1, further comprising determining the first plurality of candidates by:
   generating a first list of prospective candidates associated with the source individual;
   generating a second list of prospective candidates associated with the destination individual;
   determining one-hop matching prospective candidates by comparing the first list and the second list;
   selecting one one-hop matching prospective candidate as a first candidate of the first plurality of candidates.

10. The method of claim 9, further comprising:
    generating a third list of prospective candidates associated with one non-matching prospective candidate;
    determining two-hop matching prospective candidates by comparing the second list and the third list;
    selecting one two-hop matching prospective candidate as a second candidate of the first plurality of candidates.

11. The method of claim 1, further comprising generating an alert indicating victory when the database defines a relationship.

12. A system for providing a game in an interactive media application, comprising:
    a database;
    a processor configured to:
       access the database to identify a source individual, a destination individual, and a first plurality of candidates, wherein the first plurality of candidates is identified based on information that defines a relationship between the source individual and each of the first plurality of candidates;
       retrieve, from the database, media elements representative of the source individual, the destination individual, and each of the first plurality of candidates;
       generate a display including each of the retrieved media elements;
       receive, by user input, a selection of a media element representing one of the first plurality of candidates;

determine whether the database defines a relationship between the selected candidate and the destination individual; and identify a second plurality of candidates using the database based on information that defines a relationship between the selected candidate and each of the second plurality of candidates when the database does not define a relationship between the selected candidate and the destination individual.

13. The system of claim 12, the processor further configured to:
identify a media asset associated with the relationship between the source individual and the selected candidate; and
generate a selectable opportunity associated with the identified media asset.

14. The system of claim 13, wherein the at least one selectable opportunity comprises at least one of:
a link to view the identified media asset,
an advertisement related to the identified media asset, and
a link to view media content associated with the identified media asset.

15. The system of claim 12, the processor further configured to:
identify a media asset associated with the relationship between the source individual and the selected candidate;
bookmark the identified media asset; and
generate a representation of the bookmarked media asset for the display.

16. The system of claim 15, the processor further configured to:
generate a list of bookmarked media assets;
receive, by a user input, an indication; and
generate a display that provides the list of bookmarked media assets in response to receiving the indication.

17. The system of claim 12, the processor further configured to determine the first plurality of candidates by:
retrieving metadata associated with the source individual from the database;
comparing the identified metadata associated with the source individual with metadata associated with each of a plurality of prospective candidates;
determining whether the metadata associated with the source individual matches the metadata associated with each of the plurality of prospective candidates.

18. The system of claim 12, wherein when the database does not define a relationship between the selected candidate and the destination individual, the processor further configured to:
replace the source individual with the selected candidate.

19. The system of claim 12, wherein the game is played by a first user and a second user, the processor further configured to:
provide each user with a respective source individual, destination individual, and plurality of candidate individuals;
receive, from each user by user input, a selection of a media element representing one of the plurality of candidates provided to each respective user; and
generate an alert indicating which user has won the game.

20. The system of claim 12, the processor further configured to determine the first plurality of candidates by:
generating a first list of prospective candidates associated with the source individual;
generating a second list of prospective candidates associated with the destination individual;
determining one-hop matching prospective candidates by comparing the first list and the second list;
selecting one one-hop matching prospective candidate as a first candidate of the first plurality of candidates.

21. The system, of claim 20, the processor further configured to:
generate a third list of prospective candidates associated with one non-matching prospective candidate;
determine two-hop matching prospective candidates by comparing the second list and the third list;
select one two-hop matching prospective candidate as a second candidate of the first plurality of candidates.

22. The system of claim 12, wherein the processor is further configured to generate an alert indicating victory when the database defines a relationship.

23. A non-transitory computer-readable medium for use in providing a game in an interactive media application, the computer-readable medium having computer program instructions recorded thereon for:
accessing a database to identify a source individual, a destination individual, and a first plurality of candidates, wherein the first plurality of candidates is identified based on information that defines a relationship between the source individual and each of the first plurality of candidates;
retrieving media elements representative of the source individual, the destination individual, and each of the first plurality of candidates;
generating a display including each of the retrieved media elements;
receiving, by user input, a selection of a media element representing one of the first plurality of candidates;
determining whether the database defines a relationship between the selected candidate and the destination individual; and
identifying a second plurality of candidates using the database based on information that defines a relationship between the selected candidate and each of the second plurality of candidates when the database does not define a relationship between the selected candidate and the destination individual.

24. The non-transitory computer-readable medium of claim 23, further comprising instructions recorded thereon for:
identifying a media asset associated with the relationship between the source individual and the selected candidate; and
generating a selectable opportunity associated with the identified media asset.

25. The non-transitory computer-readable medium of claim 23, further comprising instructions recorded thereon for:
identifying a media asset associated with the relationship between the source individual and the selected candidate;
bookmarking the identified media asset; and
generating a representation of the bookmarked media asset for the display.

26. The non-transitory computer-readable medium of claim 25, further comprising instructions recorded thereon for:
generating a list of bookmarked media assets;
receiving, by user input, an indication; and
generating a display that provides the list of bookmarked media assets in response to receiving the indication.

27. The non-transitory computer-readable medium of claim 23, further comprising instructions recorded thereon for:
  retrieving metadata associated with the source individual from the database;
  comparing the identified metadata associated with the source individual with metadata associated with each of a plurality of prospective candidates;
  determining whether the metadata associated with the source individual matches the metadata associated with each of the plurality of prospective candidates.

28. The non-transitory computer-readable medium of claim 23, wherein the game is played by two or more users, the computer-readable medium further comprising instructions recorded thereon for:
  providing each user with a respective source individual, destination individual, and plurality of candidate individuals;
  receiving, from each user by user input, a selection of a media element representing one of the plurality of candidates provided to each respective user; and
  generating an alert indicating which user has won the game.

29. The non-transitory computer-readable medium of claim 23, further comprising instructions recorded thereon for determining the first plurality of candidates by:
  generating a first list of prospective candidates associated with the source individual;
  generating a second list of prospective candidates associated with the destination individual;
  determining one-hop matching prospective candidates by comparing the first list and the second list;
  selecting one one-hop matching prospective candidate as a first candidate of the first plurality of candidates.

30. The non-transitory computer-readable medium of claim 23, further comprising instructions recorded thereon for:
  generating an alert indicating victory when the database defines a relationship.

* * * * *